(12) United States Patent
Burden et al.

(10) Patent No.: US 11,465,801 B2
(45) Date of Patent: Oct. 11, 2022

(54) PAPERBOARD SHIPPING RISER

(71) Applicant: Complete Packaging Systems Inc., Whitby (CA)

(72) Inventors: Darren Burden, Bowmanville (CA); Jonathan Liberty, Etobicoke (CA)

(73) Assignee: Complete Packaging Systems Inc., Whitby (CA)

(*) Notice: Subject to any disclaimer, the term of this patent is extended or adjusted under 35 U.S.C. 154(b) by 0 days.

(21) Appl. No.: 16/193,770

(22) Filed: Nov. 16, 2018

(65) Prior Publication Data

US 2019/0144162 A1 May 16, 2019

Related U.S. Application Data

(60) Provisional application No. 62/587,438, filed on Nov. 16, 2017.

(51) Int. Cl.
*F16M 11/00* (2006.01)
*B65D 19/00* (2006.01)
(Continued)

(52) U.S. Cl.
CPC ............ *B65D 19/0002* (2013.01); *B32B 1/04* (2013.01); *B32B 1/06* (2013.01); *B32B 3/02* (2013.01); *B32B 3/06* (2013.01); *B32B 3/12* (2013.01); *B32B 3/26* (2013.01); *B32B 3/28* (2013.01); *B32B 5/02* (2013.01); *B32B 5/22* (2013.01); *B32B 5/26* (2013.01); *B32B 29/005* (2013.01); *B32B 29/02* (2013.01); *B32B 29/08* (2013.01); *B32B 2250/05* (2013.01); *B32B 2307/00* (2013.01); *B32B 2307/718* (2013.01); *B32B 2317/127* (2013.01); *B65D 2519/00019* (2013.01); *B65D 2519/00054* (2013.01); *B65D 2519/00273* (2013.01); *B65D 2519/00278* (2013.01); *B65D 2519/00293* (2013.01); *B65D 2519/00303* (2013.01); *B65D 2519/00323* (2013.01); *B65D 2519/00333* (2013.01); *B65D 2519/00358* (2013.01); *B65D 2519/00562* (2013.01); *B65D 2519/00567* (2013.01)

(58) Field of Classification Search
CPC .... B32B 3/08; B32B 3/00; B32B 3/12; B65D 19/0002
See application file for complete search history.

(56) References Cited

U.S. PATENT DOCUMENTS 5,433,156 A 7/1995 Hutchison
5,458,068 A 10/1995 Kilpatrick et al.
(Continued)

OTHER PUBLICATIONS

Notification, and The International Search Report and the Written Opinion of the International Searching Authority, or the Declaration, PCT/US2018/061576, dated Feb. 28, 2019, 12 pages.
(Continued)

*Primary Examiner* — Amy J. Sterling
(74) *Attorney, Agent, or Firm* — Barley Snyder

(57) ABSTRACT

A shipping riser is provided and includes an engineered structure. The engineered structure includes a central laminated structure, a pair of middle laminated structures positioned on and secured to opposite sides of the central laminated structure, and a pair of outer laminated structures positioned on and secured to opposite sides of the pair of middle laminated structures.

30 Claims, 28 Drawing Sheets

(51) Int. Cl.
  *B32B 3/12*    (2006.01)
  *B32B 3/28*    (2006.01)
  *B32B 29/08*   (2006.01)
  *B32B 29/00*   (2006.01)
  *B32B 5/02*    (2006.01)
  *B32B 1/04*    (2006.01)
  *B32B 1/06*    (2006.01)
  *B32B 5/26*    (2006.01)
  *B32B 29/02*   (2006.01)
  *B32B 3/26*    (2006.01)
  *B32B 3/02*    (2006.01)
  *B32B 5/22*    (2006.01)
  *B32B 3/06*    (2006.01)

(56) References Cited

U.S. PATENT DOCUMENTS

| | | |
|---|---|---|
| 5,685,234 A | 11/1997 | Grigsby et al. |
| 5,784,971 A | 7/1998 | Chang |
| 2007/0221537 A1 | 9/2007 | Macqueen et al. |
| 2011/0195231 A1 | 8/2011 | Lai et al. |
| 2016/0039567 A1* | 2/2016 | Love .................. B65D 19/0069 108/51.3 |

OTHER PUBLICATIONS

Notification, and The International Preliminary Report on Patentability and the Written Opinion of the International Searching Authority, PCT/US2018/061576, dated May 28, 2020, 8 pages.

* cited by examiner

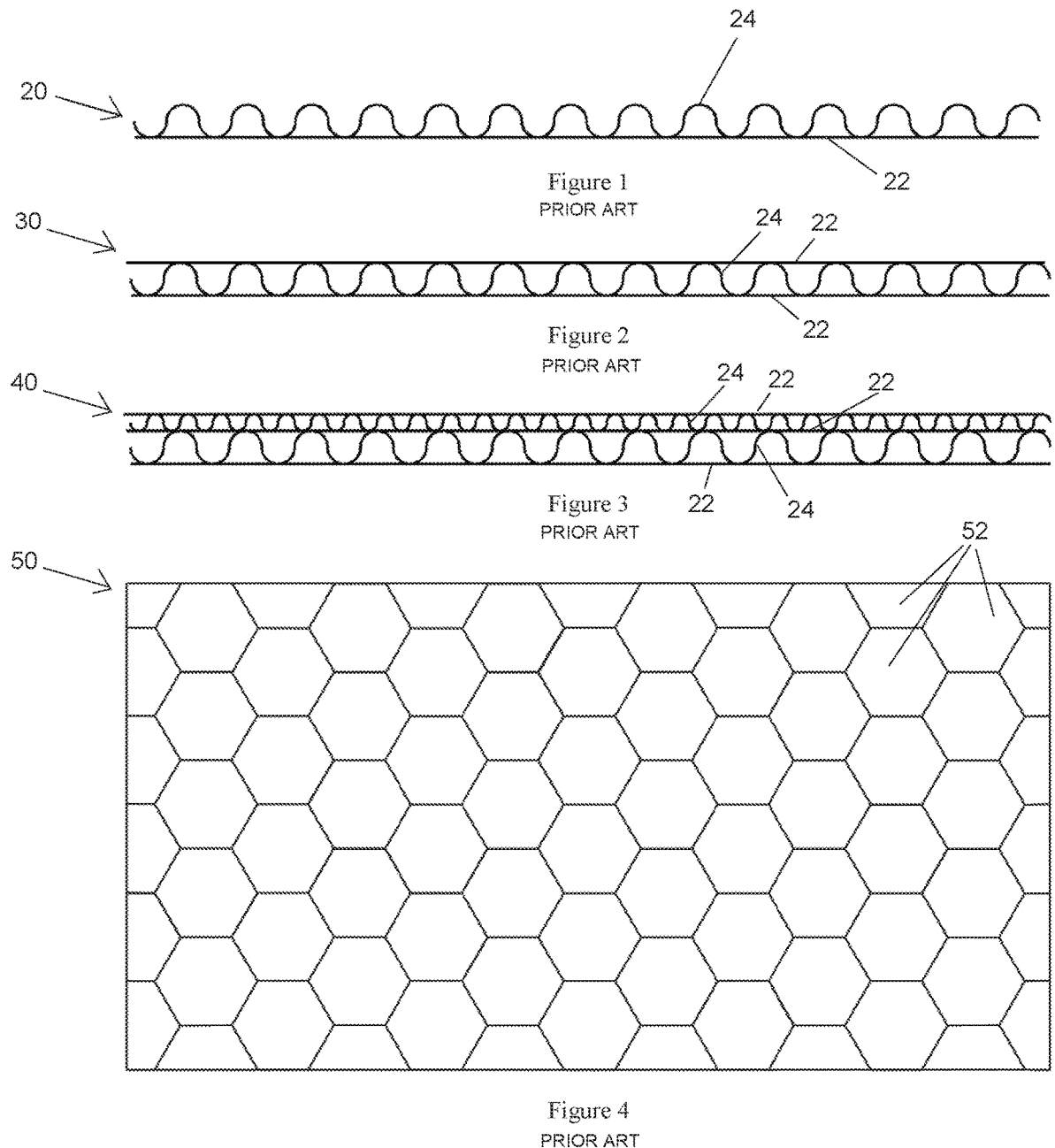

PAPERBOARD SHIPPING RISER

CROSS-REFERENCE TO RELATED APPLICATION

This application claims priority under 35 U.S.C. § 119 to U.S. Provisional Patent Application No. 62/587,438 filed Nov. 16, 2017.

FIELD OF THE INVENTION

The present invention relates to a shipping riser and, more particularly, to a paperboard shipping riser.

BACKGROUND

Given that costs of shipping goods from one point to another are ever increasing, there is greater need for ensuring the safe delivery and a least amount of damage of those goods in order to keep costs as low as possible. Costs associated with shipping goods are the costs for transport related packaging materials and time. Packaging materials take resources to manufacture and ship to the point where they can be used to further ship goods. The packaging materials themselves are products and need to be efficiently handled.

Shipping risers for the packaging industry are packaging materials used to raise goods from the floor of a shipping container or railcar in order to stabilize loads and prevent shipping damage during transportation. Load stability is required for the safety of individuals working with the loaded goods, the railcar, truck, and container that transports the goods, and the environment through which the container and the goods travel. Risers ensure that a good may be transported safely and easily with the least amount of cost, risk, and damage.

Shipping risers differ from pallets or portable platforms used in the storage or shipping of goods. Risers are materials used to raise the good from the floor or ground on which the good would typically be placed during transport. Goods may be stored on pallets and this enables the pallet and good to be lifted at the same time, thereby becoming a single unit. Risers provide for the positioning of the good during storage and transport as they simply create a space below the good to be shipped. They are not used in the lifting of the good by adding structure. The good placed on the shipping riser does not become parts of a different shipping or storage structure as with the pallet.

Risers are used, for example, for the rail and truck transportation of large roll materials such as finished paper. They are used to raise and position rolls of paper in a railcar or container during shipping. Risers raise the roll from the floor surface so that the paper roll can be stabilized from movement, stabilize adjacent rolls by blocking incomplete layers, stabilize associated rolls by raising strata levels, and raise rolls at doorways so that additional equipment is not impeded from use.

Rolls of paper are cylindrical in shape with a paperboard core and often weigh several thousand pounds. For shipping, rolls are placed on their flat ends for stability and for the prevention of roll movement. These rolls are wrapped prior to use for transportation and storage protection. The rolls are often wrapped in paper, which makes them susceptible to movement even when placed on flat surfaces. Sliding movement during transport can occur as the vehicle moves, and without restraint, the roll can move within the vehicle space. Movement may be further compounded when rolls are stacked on top of each other for space shipping maximization. Stability is thus critically important for safety and damage prevention. Damage may occur from instability of a load or the items being in direct contact with the floor of a railcar or shipping container.

Traditionally, shipping risers are in the form of independent sticks and pads. The stick risers are rectangular elements that are placed parallel on the floor of a container or railcar and then a roll of paper is placed on it. Stick risers cover less than 25% of the surface area of a roll and their positioning and use is both limited and controlled in height and position in a railcar to ensure safety and stability of the roll. Pads have a size corresponding to the paper roll and are constant in thickness and height. Pads may be square or round in shape covering greater than 50% of the roll surface area and are also controlled in their placement and use. Both stick risers and pads may be constructed of cardboard paperboard, honeycomb paperboard materials, and wood.

With reference to FIG. 1, a known layer of corrugated paper 20 is shown. The corrugated paper 20 has specifications defined by the roller that forms it during the manufacturing process. The shown corrugated paper 20 is a single layer type and includes a single flat sheet of liner paper 22 with a corrugate 24 secured to the liner paper 22 using an adhesive. The corrugate 24 is secured to the liner 22 where the two parts tangentially contact one another. The smaller, thinner, and more-dense corrugate 24 uses less paper to form and results in a stronger corrugate 24 when laminated to the flat paper liner 22. Larger corrugate 24 uses more paper in its forming and the corrugate 24 is thicker. Corrugate 24 and liner 22 are controlled and strengthened through the thickness of the paper that is used in their construction. Less dense corrugate 24 may appear to be weaker than a high density corrugate 24 material; the strength can be controlled by the thickness of the paper that is used to construct the corrugate 24. Varying the paper thickness for the corrugate 24 and the flat liner 22 provides the manufactured paperboard to be strong, lightweight and economical.

As shown in FIG. 2, a pair of liners 22 are attached to a single fluted corrugate 24 to create a single walled corrugated paperboard 30. The strength and versatility for packaging increases in such a design. Laminating layers of single faced corrugated paper 20 or single walled corrugated paperboard 30 together increases the strength and versatility of the constructed board. A double walled corrugated paperboard 40, shown in FIG. 3, is comprised of three pieces of liner 22 and two corrugated pieces of paper 24. These laminated layers can further be strengthened by varying the size and density of the corrugate 24 and the paper thicknesses used in the construction of the liner 22 and corrugate 24 material. By combining the materials in differing sequence, the edge compression and loading capabilities of a structure can be varied and increased.

Through the lamination of higher density fluted cardboard, structure is increased. Structure is defined as the ability of the materials to withstand load applications and stressors. The greater the number of flutes in the corrugate 24, the greater the ability of paperboard 20, 30, 40 to withstand edge compression loading. The increased number of flutes results in the paperboard 20, 30, 40 becoming more densely spaced and more like a solid board. Fluting reduces the paper content and increases air to make a strong and lighter weight material. Increasing the size and density of paper fluting in a corrugated paperboard 20, 30, 40 reduces a quantity of paper, increases thickness, and ultimately reduces costs for a similar strength material. By varying fluting density and size, corrugated paperboard 20, 30, 40 has the ability to achieve great strength and structure. This flexibility can be used to construct laminated structures that are both strong and lightweight.

As shown in FIG. 4, a layer of honeycomb paperboard 50 is shown, and is similar to double walled corrugate paperboard 40 in that it is made of two flat layers and a single formed element. Honeycomb is different from corrugate though in that its internal structure is not formed. Honeycomb cells 52 are expanded cells created through the application of an adhesive. The honeycomb is pulled to expand and a generally six sided cell 52 is created. Its strength is again defined by the thickness of the paper used in its construction. Strength is further defined by the size of the cell 52 manufactured; smaller cells 52 have greater compression strength, given the density of the cells, over a larger cell. Honeycomb differs from corrugate in that the cell 52 height can be many times greater than the corrugate paper. Where a corrugate board may be a fraction of an inch in height, a honeycomb cell 52 may be several inches in height. This height ability allows it to act as a gap filler without the added weight or cost Honeycomb paperboard 50 is generally comprised of facing materials sandwiching expanded honeycomb paper. The honeycomb paper is expanded multisided cells 52. The majority of the structure is air with the inner honeycomb material being expanded paper that forms cells 52. These cells 52 are capped with flat facing material thereby sealing the cell 52. The paper material used for the cells 52 and the facing can have different thicknesses that then result in differing strengths. The cell 52 size of the honeycomb defines the density and the strength of the board once adhesive is applied and the structure is formed. When loads are placed on the facing material of the honeycomb it is capable of supporting weight as the face material and cells 52 disperse the load.

A major difference between corrugated paperboard 20, 30, 40 and honeycomb paperboard 50 is the direction of the strength or loading ability. Corrugated paperboard 20, 30, 40 is strong when formed and when a load is placed on its edge. It has a high degree of edge crush strength. If loads are placed on the flat surface of the corrugated paperboard 20, 30, 40 when the board is flat on a surface, the board will compress and the corrugate 24 will collapse to the thickness of the components. Unlike cardboard, honeycomb paperboard 50 has low edge crush strength and high flat surface compression. The sides of a cell 52 crush easily while the cell 52 top or bottoms are stronger due to the number of cells 52 and the wall structure. Simply, the difference between the corrugated 20, 30, 40 and honeycomb 50 boards is based on the direction of the long axis of the corrugate or the cell structure.

Known honeycomb shipping risers are large, bulky pads generally made of air and take up more space that is needed. Known solid strip risers are generally made of wood that make the structure heavy and bulky to use. Both known risers and pads are inefficient in their storage and transport prior to their use, as they either are solid, and therefore heavy, or made up of mainly of air, and therefore require considerable storage space for their strength. Therefore, there is a need for a shipping riser that is less cumbersome and bulky, and that provides the support needed to maintain structural integrity.

SUMMARY

In view of the aforementioned shortcomings, a shipping riser according to the invention is provided and includes an engineered structure. The engineered structure includes a central laminated structure, a pair of middle laminated structures positioned on and secured to opposite sides of the central laminated structure, and a pair of outer laminated structures positioned on and secured to opposite sides of the pair of middle laminated structures.

BRIEF DESCRIPTION OF THE DRAWINGS

For a better understanding of embodiments of the invention described herein, and to show more clearly how they may be carried into effect, reference will be made, by way of example, to the accompanying drawings in which:

FIG. 1 is a sectional side view of a known layer of corrugated paper;

FIG. 2 is a sectional side view of a known layer of corrugated paperboard;

FIG. 3 is a sectional side view of a known layer of double walled corrugated paperboard;

FIG. 4 is a top view of a known layer of honeycomb paperboard;

DETAILED DESCRIPTION OF THE EMBODIMENT(S)

Figure 5:
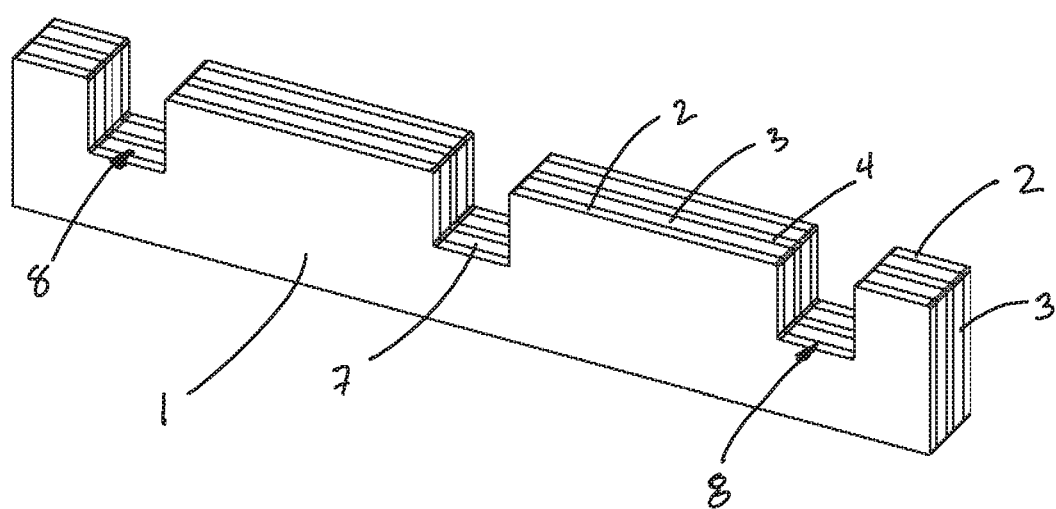
FIG. 5 is a perspective view of a riser according to the invention.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

A shipping riser 1 according to an embodiment is shown in FIGS. 5, 6, 8-10, and 19-31.

As shown in FIG. 5, the shipping riser 1 is an engineered structure consisting of laminated structures 2, 3, 4 that are formed together using known lamination processes or adhesives. Water based, chemical or thermal adhesives may be used in the construction. These adhesives are applied to paper surfaces of the laminated structures 2, 3, 4 and then the materials are assembled to make a stronger element. Individual paperboard is strengthened when combined with another paperboard element. The adhesive process may flood or evenly coat a surface or the adhesive may be applied in a pattern. Both methods of applying adhesive have the ability of further strengthening the engineered structure. Strength is achieved through the amount of surface contact by applying adhesive or it can be achieved by the adhesive itself creating a structure. Stress and strain can be controlled through the adhesive and these forces can be used to create structure in the paper and adhesive assembly.

Figure 7:
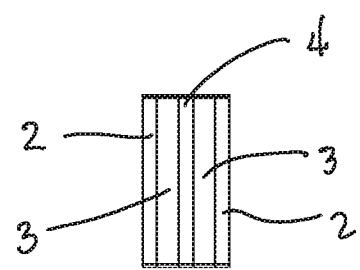
FIG. 7 is an end view of the shipping riser according to the invention.
Figure 11:
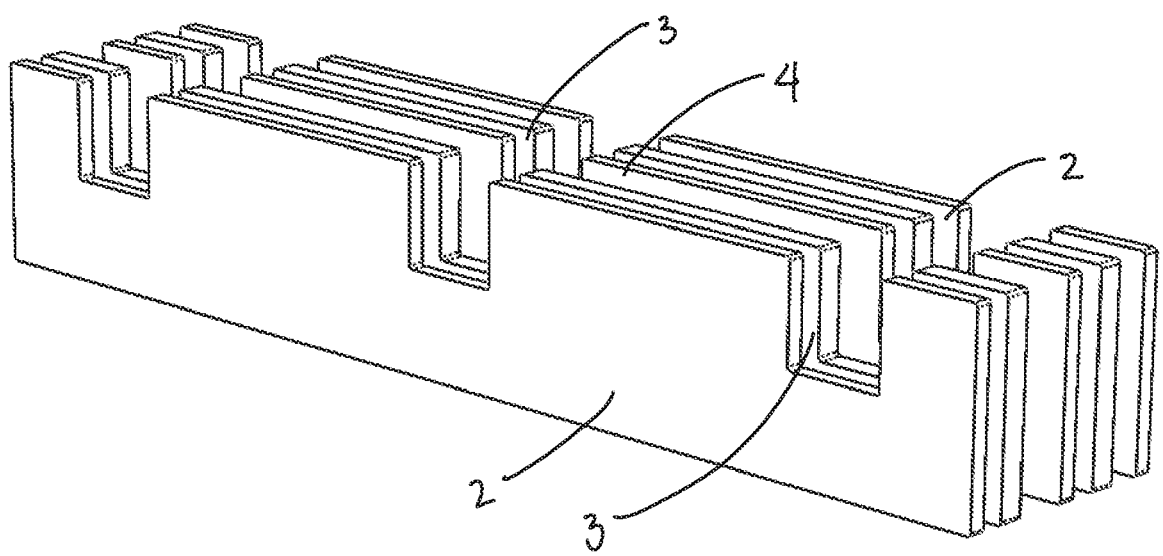
FIG. 11 is an exploded perspective view of the shipping riser according to the invention.

As shown in FIGS. 5, 7, and 11 the shipping riser 1, as an engineered structure, generally includes an outer laminated structure 2, a middle laminated structure 3, and a central laminated structure 4. The laminated structures 2 and 3, as shown in FIGS. 5, 7, and 11 are disposed symmetrically about the central laminated structure 4. In the shown embodiment, the shipping riser 1 includes five laminated structures positioned side by side and secured to each other. In other embodiments, the number of laminated structures could vary, as construction would be dependent on requirement usage, cost of the materials, and manufacturing specifications. According to the invention, the laminated structures 2, 3 are symmetrically positioned about the central laminated structure 4, which provides strength and functionality for manufacturing, loading, and weight bearing with the shipping riser 1.

In the shipping riser 1 according to an embodiment of the invention, individual layers of corrugate cardboard, honeycomb cardboard or fibrous materials are used to construct the laminated structures 2, 3, 4 and the shipping riser 1 through the use of adhesive and pressure. Utilizing similar and dissimilar materials into a heterogeneous structure, the lamination creates a singular shipping riser 1 member ensuring load capability and functionality. Laminated sections and zones with higher structural ability are constructed using corrugated paperboard. The combination of laminated structures 2, 3, 4 include multiple corrugated cardboard elements oriented with the corrugation in the direction of the intended applied load results in a structure with higher edge strength. In order to reduce the number of laminations, double walled cardboard with high density corrugation may be used. By further creating directionality in the section, i.e. laminating the corrugations in the same layer sequence E-B, E-B the structure is ensured. Sections with lower structural ability or compressive strength can be created by larger corrugated cardboard elements or honeycomb cardboard. Larger corrugate or cell structure increases air space and reduces weight of the shipping riser 1. By incorporating lighter sections in areas where structure is not required a stronger structural riser 1 is constructed.

The shipping riser 1 according to an embodiment of the invention is constructed of sections with high and low compressive ability that are symmetric to the center plane of the shipping riser 1 and with higher strength sections to the outside and the central planes. Areas in between these high strength sections are lower strength. With the high compression zones to the outside of the shipping riser 1, the effects of crush or compression forces related to the load or load movement are reduced. Uneven loading or movement can result in greater forces being created and applied to the shipping riser 1. Using the higher compression zone to the outside of the member the forces can be controlled The outer laminated structure 2 and the central laminated structure 4 have a higher ability for load bearing and the middle laminated structure 3 has a lower capacity for load bearing. The combination of laminated structures 2, 3, 4 are constructed of laminated corrugated paperboard and honeycomb paperboard. In an embodiment, the structures 2, 3, 4 are of equal or similar thickness for manufacturing. In an embodiment, the outer laminated structure 2 and the central laminated structure 4 are corrugated paperboard constructed through lamination of single and double walled corrugated board to create higher density, stronger and greater load bearing capability, and the middle laminated structure 3 is a honeycomb paperboard. Each laminated structure 2, 3, 4 is of approximately the same size and shape and the structures 2, 3, 4 are differentiated by their compression or load bearing ability.

In other embodiments, it is possible to use a single type of material in the construction of the shipping riser 1. The shipping riser 1 may be constructed of similar and differing types corrugated cardboard to create a strong, robust and heavy member. The shipping riser 1 may be constructed by laminating similar and differing sizes of honeycomb cardboard to yield a lightweight member. Both singularly constructed risers 1 have differing loading and compression abilities and applications. By varying the materials in their laminated combinations, greater strength, structure and flexibility is possible.

The shipping riser 1 according to an embodiment of the invention, as shown in FIG. 5, includes a plurality of slots 7, 8 extending through the shipping riser 1 in a direction perpendicular to a longitudinal direction of the shipping riser 1. The slots 7, 8 permit assembly of the shipping riser 1 with another riser 1, as described in greater detail below.

Figure 6:
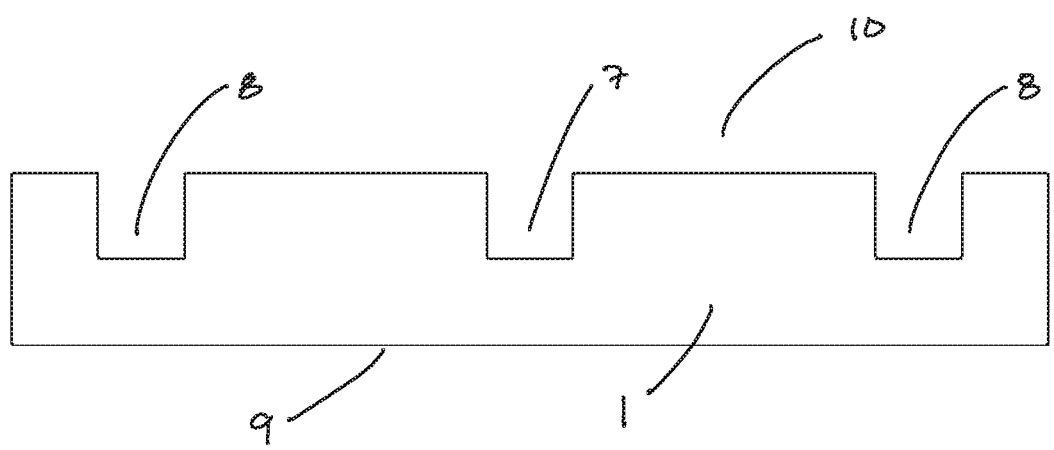
FIG. 6 is a side view of the shipping riser according to the invention.

As shown in FIG. 6, the slots 7, 8 include a central slot 7 and a pair of outer slots 8. The outer slots 8 are distal on the shipping riser 1 and are symmetric of a central plane extending through the shipping riser 1. The number of outer slots 8 depends on a length of the shipping riser 1 and can be more or less than the pair of outer slots 8 in the shown embodiment. The maximum number of slots 7, 8 in a riser 1 is defined by the stability of the shipping riser 1 and the material that is used in the construction. The dimension of the slots 7, 8 is defined by the thickness and height of riser 1. The slots 7, 8 width is the same or less than the thickness of the shipping riser 1 in a width direction extending perpendicular to a longitudinal direction of the shipping riser 1. The height of the slots 7, 8 in a height direction extending perpendicular to both the longitudinal direction and the width direction is the same as or greater than half of the height of the shipping riser 1; if the height of the slot 7, 8 were less than one half of the height of the shipping riser 1, assembly of two risers 1 would be difficult. As shown in FIG. 6, the slots 7, 8 are made into one side of the shipping riser 1 in order to ensure a constant beam or structural member. Offset slots 7, 8 are also possible. A riser 1 with opposing slots, i.e. slots on either side of a taller beam allows for an interlocking type of assembly.

Figure 8:
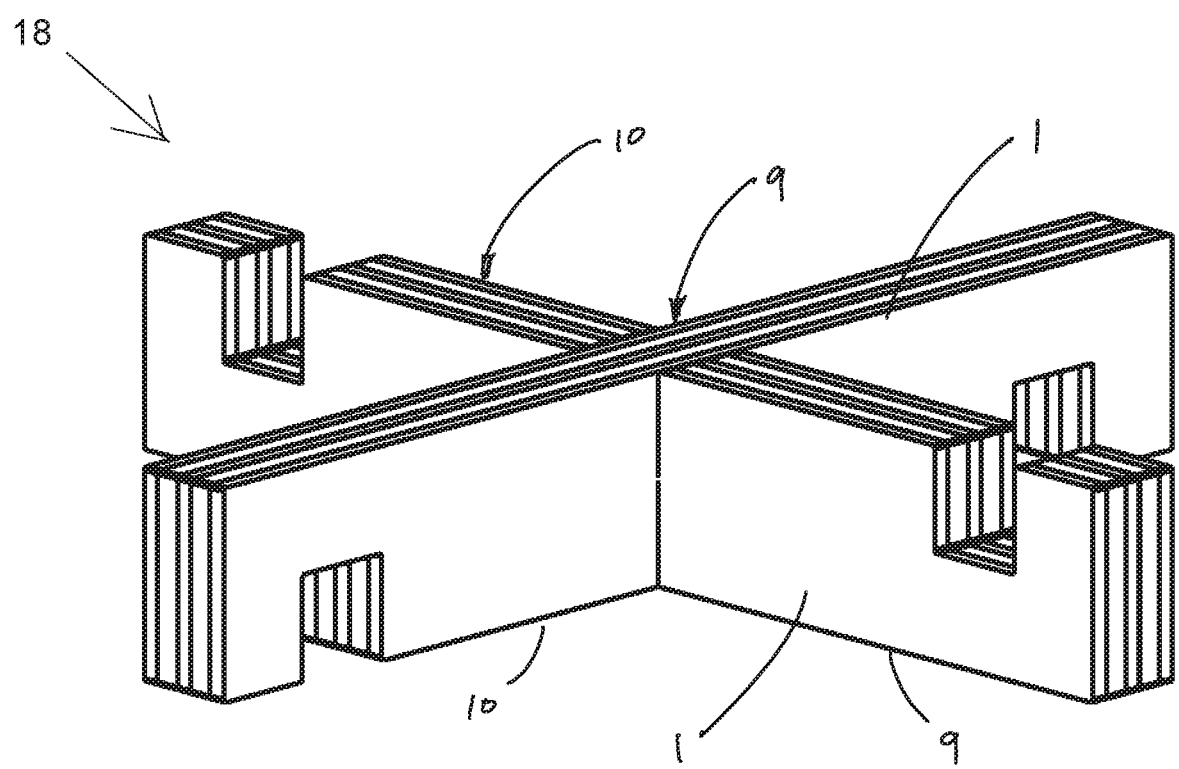
FIG. 8 is a perspective view of a riser assembly according to the invention.
Figure 9:
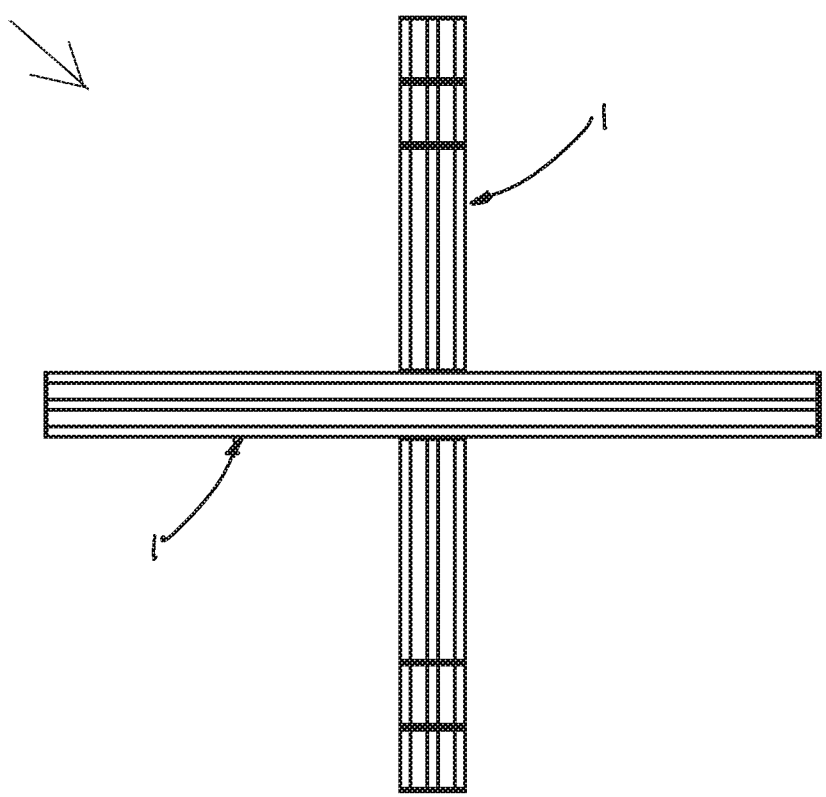
FIG. 9 is a top view of the shipping riser assembly of FIG. 8.

A riser assembly 18 of two risers 1 according to an embodiment is shown in FIGS. 8 and 9. The shipping riser assembly 18 shown in FIGS. 8 and 9 may be referred to as a two-piece riser assembly 18. A first riser 1 is assembled to a second riser 1 at the central slots 7 by inverting the first riser 1 and inserting it into the second riser 1. The assembly 18 has a same height as a single riser 1.

Figure 10:
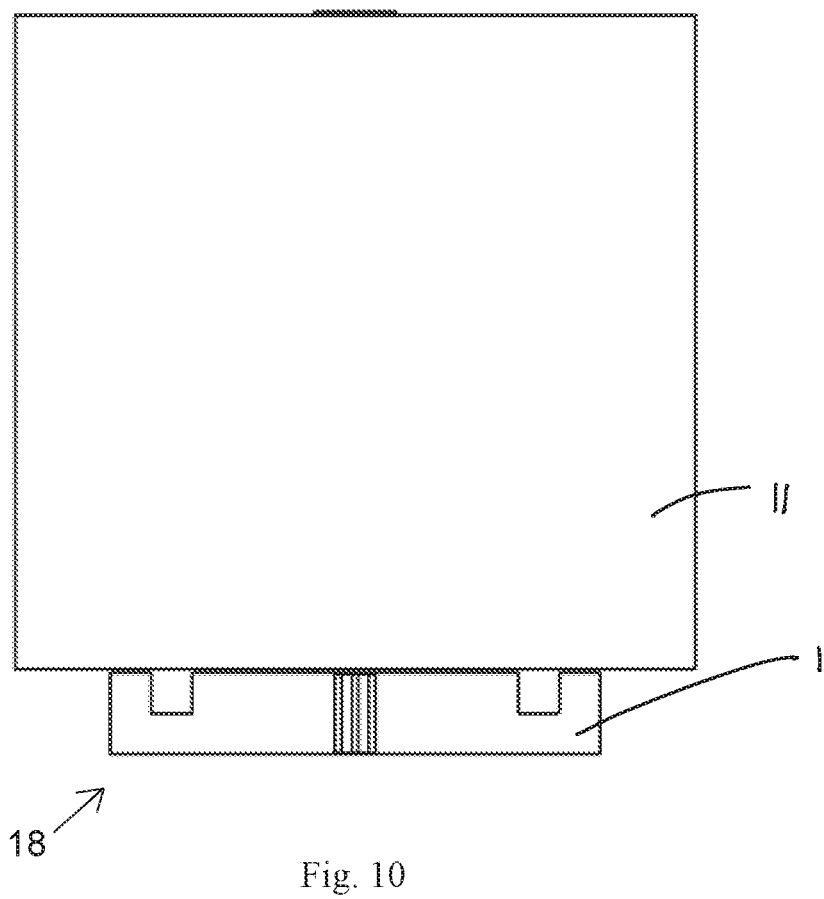
FIG. 10 is a side view of the shipping riser assembly of FIG. 8 with a paper roll.

The two-piece riser assembly 18 is shown with a paper roll 11 in FIG. 10. The two-piece riser assembly 18 formed in a cross configuration is used for smaller paper rolls, and in this embodiment it is centrally positioned under the paper roll 11 with the shipping risers 1 not extending beyond the paper roll 11 perimeter. The two-piece assembly 18 supports a central core 5 of the paper roll 11 shown in FIG. 21. Stability of the roll 11 placed on the assembly 18 is maintained by the assembly 18 maintaining a uniform height as it raises the load from a floor surface.

The slots 7, 8 may be cut at different angles which then determine an angle of the assembly of the shipping riser 1. A cut-out at right angles to the surface of the shipping riser 1 will assembly the shipping riser 1 at right angles to each other. Alternative angles provide different type of assembly.

Figure 12:
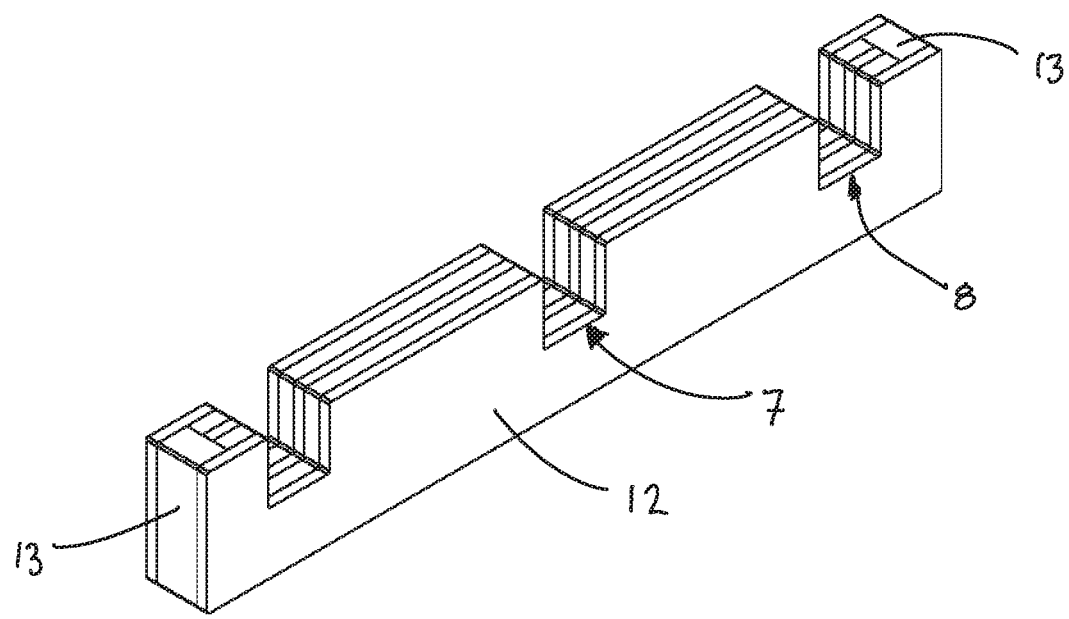
FIG. 12 is a perspective view of a reinforced riser according to the invention.
Figure 13:
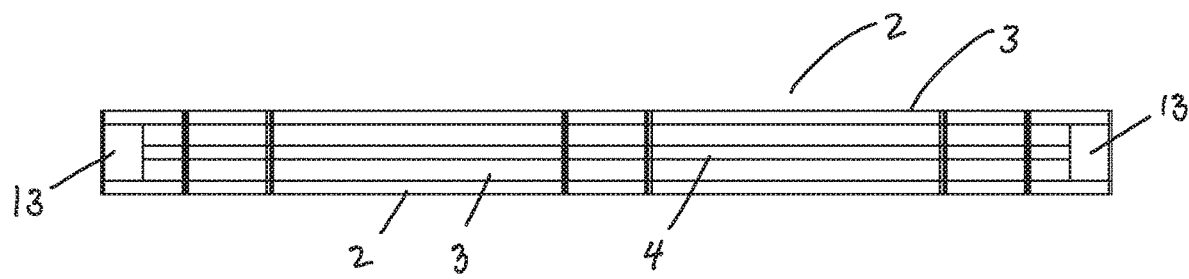
FIG. 13 is a top view of the reinforced riser of FIG. 12.
Figure 14:
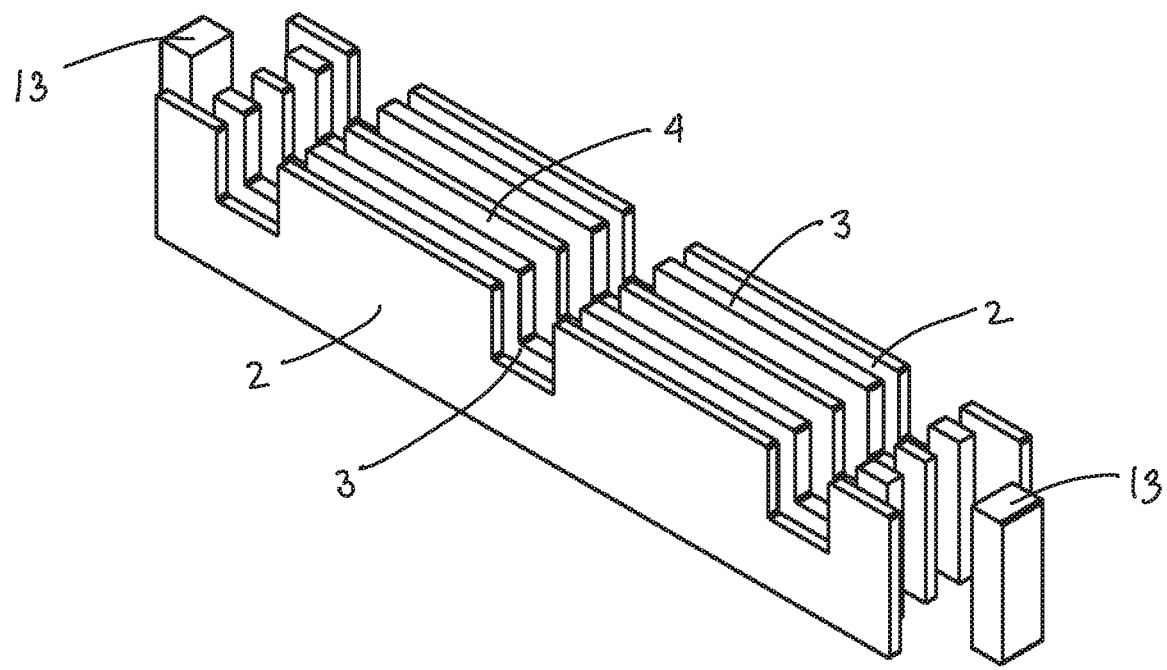
FIG. 14 is an exploded perspective view of the reinforced riser of FIG. 12.

A reinforced riser 12 according to another embodiment is shown in FIGS. 12-14. The reinforced riser 12 includes an additional end block 13 at each of the opposite ends of the shipping riser 1 in the longitudinal direction of the shipping riser 1. These end blocks 13 are incorporated into the shipping riser 1 by the shortening of the middle laminated structures 3 and the central laminated structure 4. The end block 13 is a laminated construction of densely constructed corrugated cardboard or fibrous based materials and is secured by an adhesive to the laminated structures 2, 3, 4 to complete the shipping riser 12. The laminated cardboard construction of the end blocks 13 provides for greater load strength and compression capability for the shipping riser 12, providing for greater and continuous perimeter strength. The incorporation of the end blocks 13 in the shipping riser 12 creates a perimeter of material with equal strength and load bearing capability. The end blocks 13 thickness is based on the thickness of the outer laminated structure 2. The overall thickness of the end block 13 is less than 75% of the distance to the outer slot 8 along the longitudinal direction of the shipping riser 1. Thicker end blocks 13 approaching 75% are integrated with the central laminated structure 4 creating an optional keyed feature.

Figure 15:
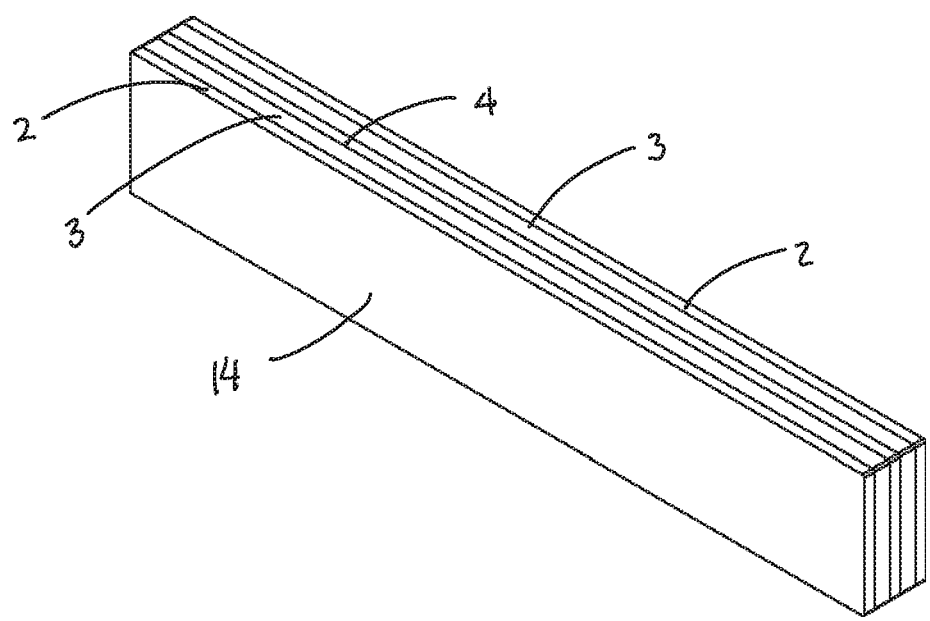
FIG. 15 is a perspective view of a block riser according to the invention.
Figure 16:
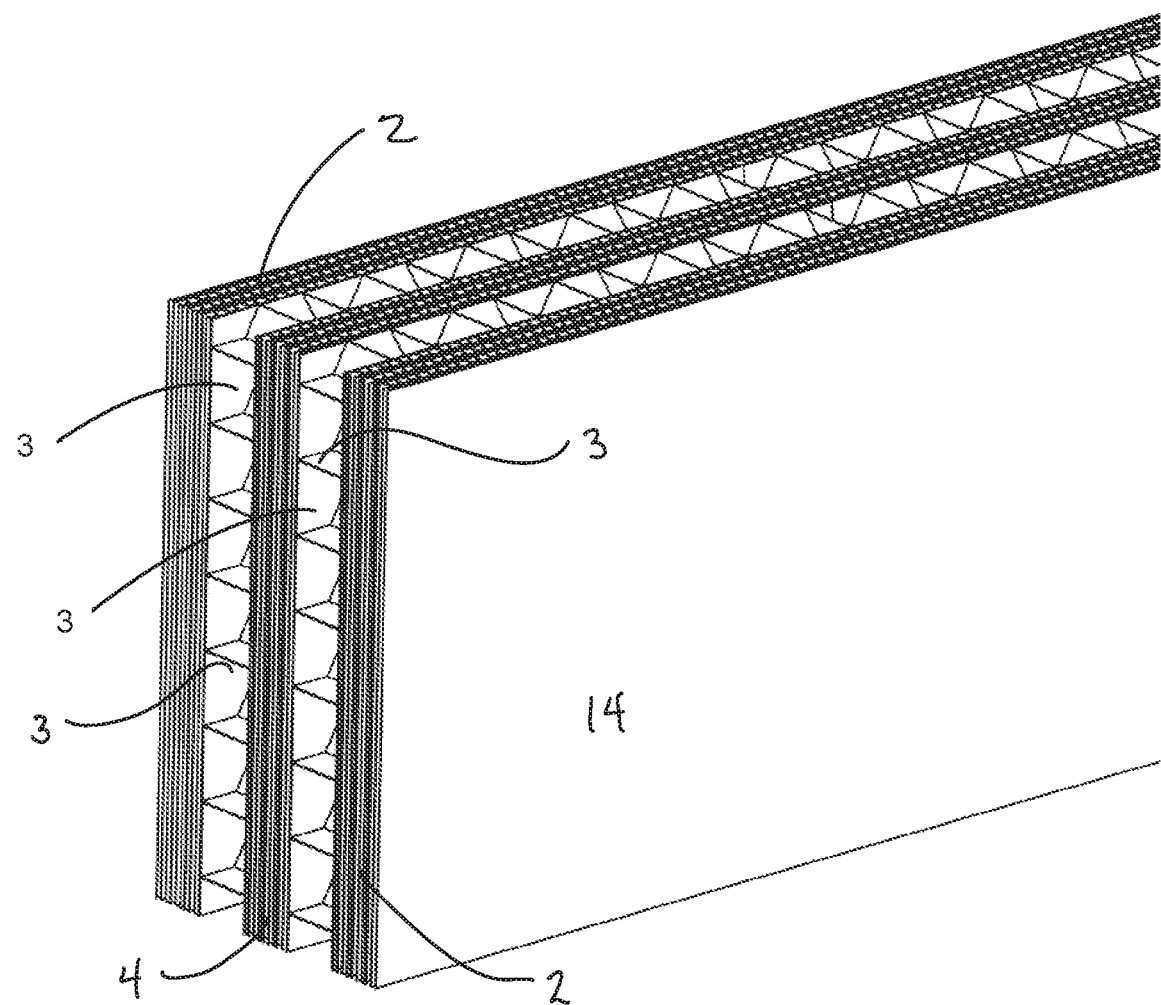
FIG. 16 is a detailed perspective view of an end of the block riser of FIG. 15.

A block riser 14 according to another embodiment is shown in FIGS. 15 and 16. The block riser 14 includes the laminated structures 2, 3, 4 described above in the shipping riser 1 prior to cutting the slots 7, 8. As shown in FIG. 16, the outer laminated structure 2 and the central laminated structure 4 are constructed of corrugated paperboard and the middle laminated structure 3 is constructed of honeycomb paperboard. The corrugated cardboard is closed to the ends and top of the block riser 14. The cut honeycomb edge is open and more susceptible to damage and compressive forces.

Figure 17:
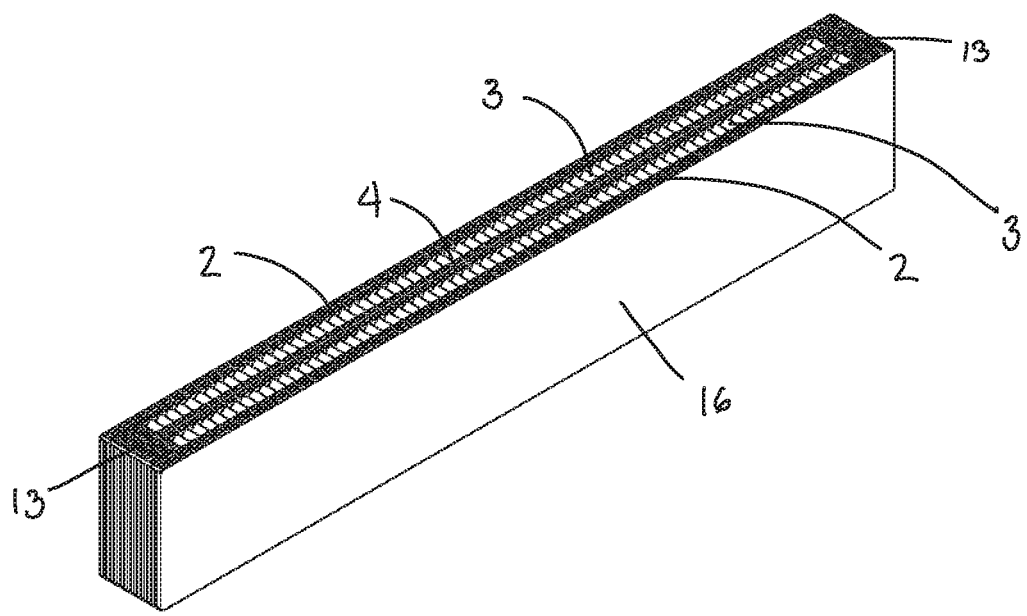
FIG. 17 is a perspective view of a strengthened block riser according to the invention.
Figure 18:
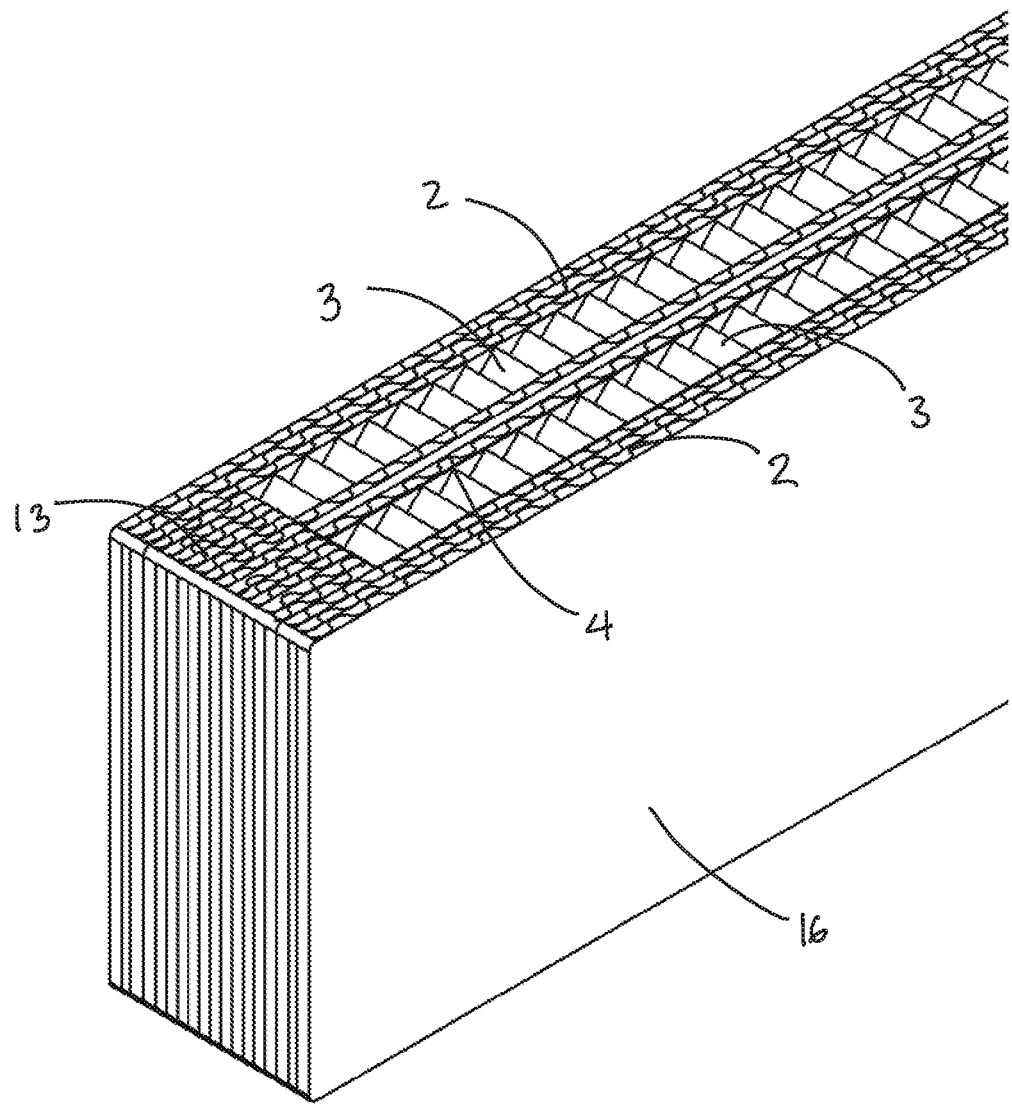
FIG. 18 is a detailed perspective view of an end of the strengthened block riser of FIG. 17.
Figure 19:
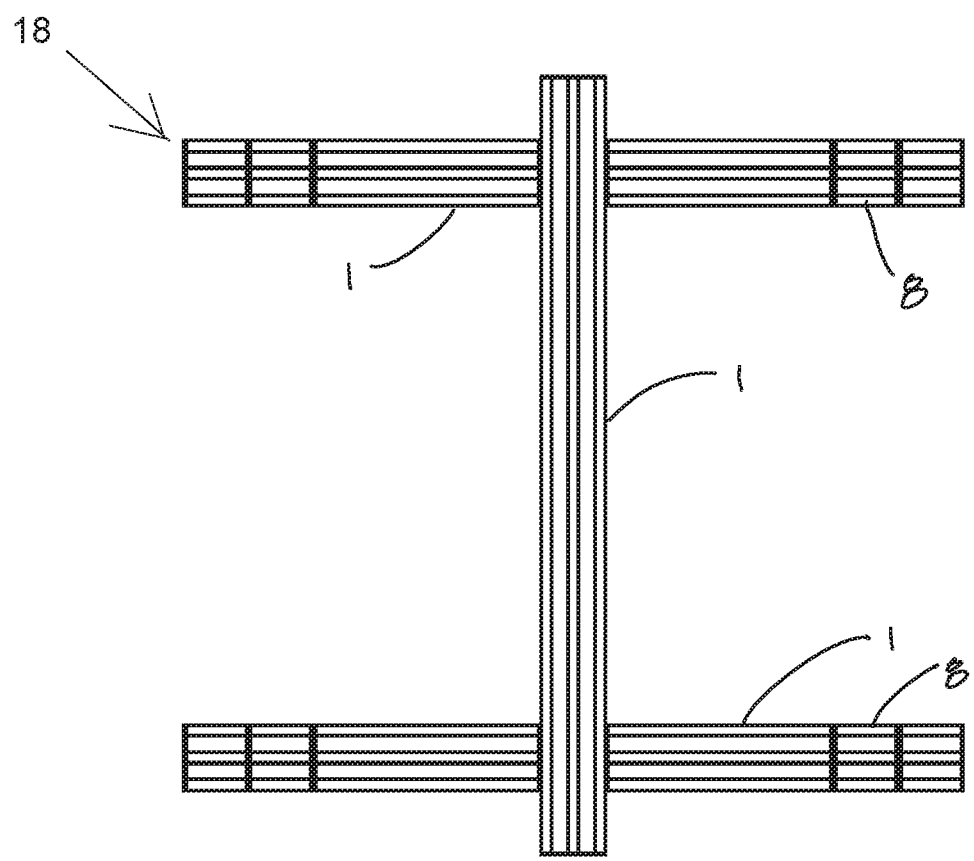
FIG. 19 is a top view of a riser assembly according to the invention.
Figure 20:
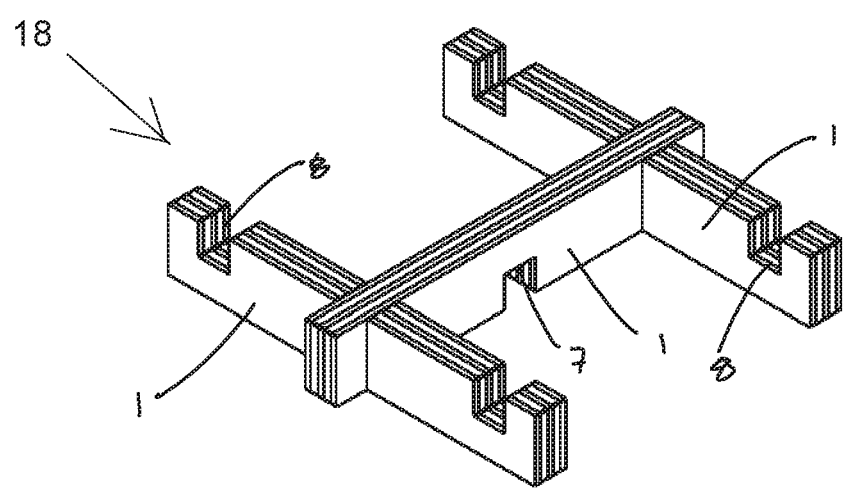
FIG. 20 is a perspective view of the shipping riser assembly of FIG. 19.
Figure 21:
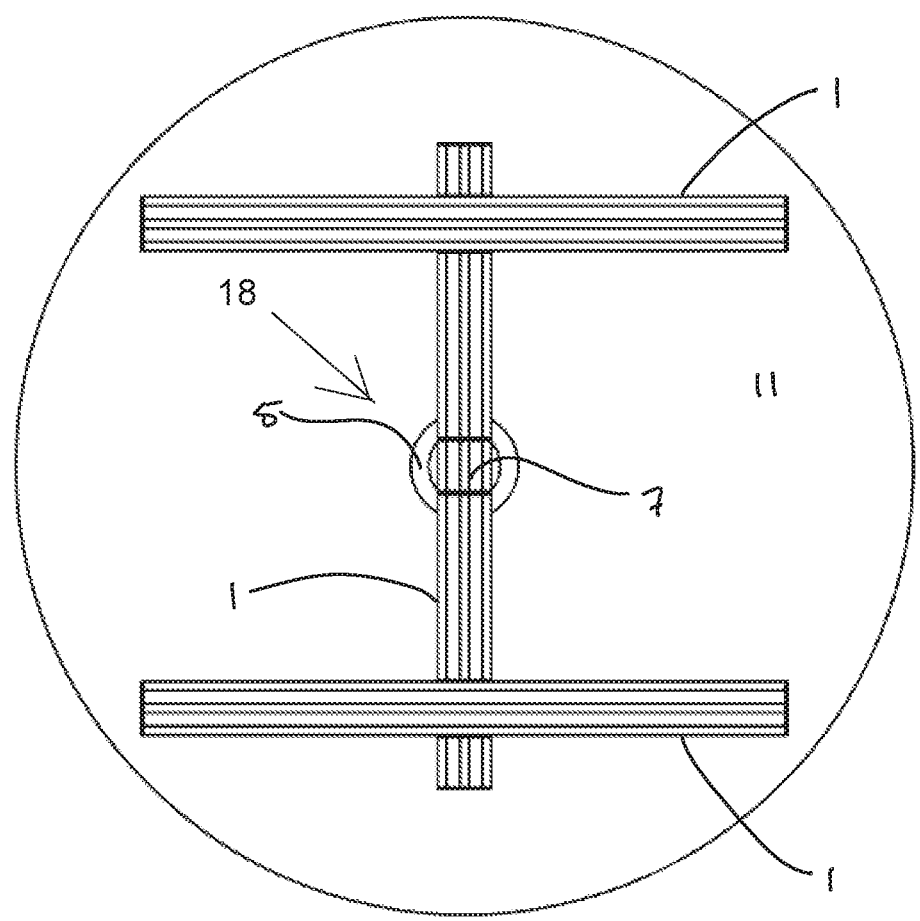
FIG. 21 is a bottom view of the shipping riser assembly of FIG. 19 with a paper roll.
Figure 22:
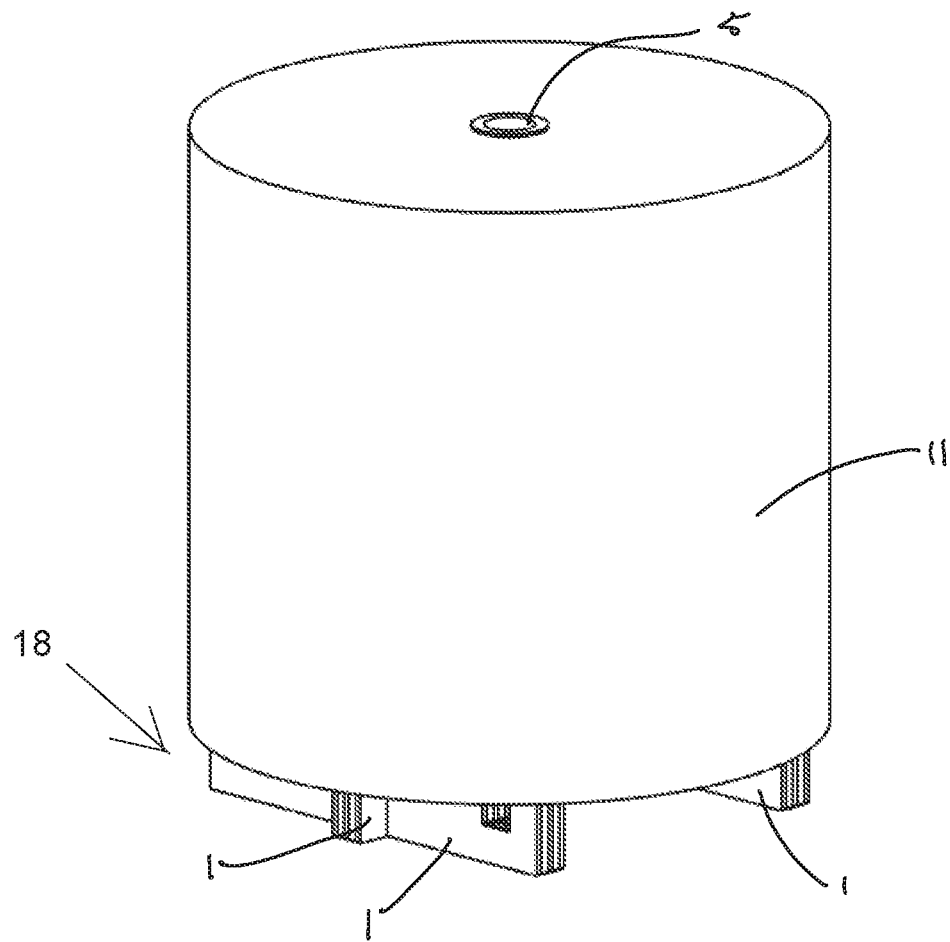
FIG. 22 is a perspective view of the shipping riser assembly of FIG. 19 with the paper roll.

A strengthened block riser 16 according to another embodiment is shown in FIGS. 17 and 18. The strengthened block riser 16 has the five laminated structures 2, 3, 4 of the shipping riser 1 with the end blocks 13 of the reinforced riser 12, and is prior to cutting the slots 7, 8 in the reinforced riser 12. As evident in FIG. 18, the outer laminated structure 2, the central laminated structure 4, and the end blocks 13 are more capable of supporting top mounted loads over the honeycomb cells of the middle laminated structures 3 because the corrugate extends to the edge of the material.

With reference to FIGS. 19-22, a riser assembly 18 according to an embodiment of the invention is shown and generally includes three shipping risers 1 arranged and connected into a support assembly. In the three-piece riser assembly 18, the central slot of each of two risers 1 is inserted into one of the outer slots 8 of another inverted riser 1. The assembly 18 is symmetric in shape about a central plane of the central inverted riser 1. In an embodiment, a fourth riser 1 can also be added to the assembly at the central 7 slot of the inverted riser 1. The three-piece riser assembly 18 is shown supporting a paper roll 11 in FIGS. 21 and 22. The assembly 18 supports a core 5 of the paper roll 11.

Figure 23:
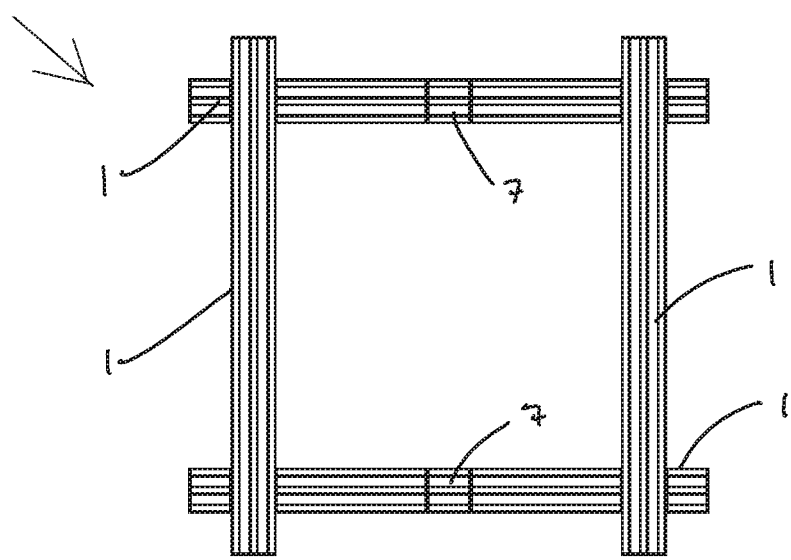
FIG. 23 is a top view of a riser assembly according to the invention.
Figure 24:
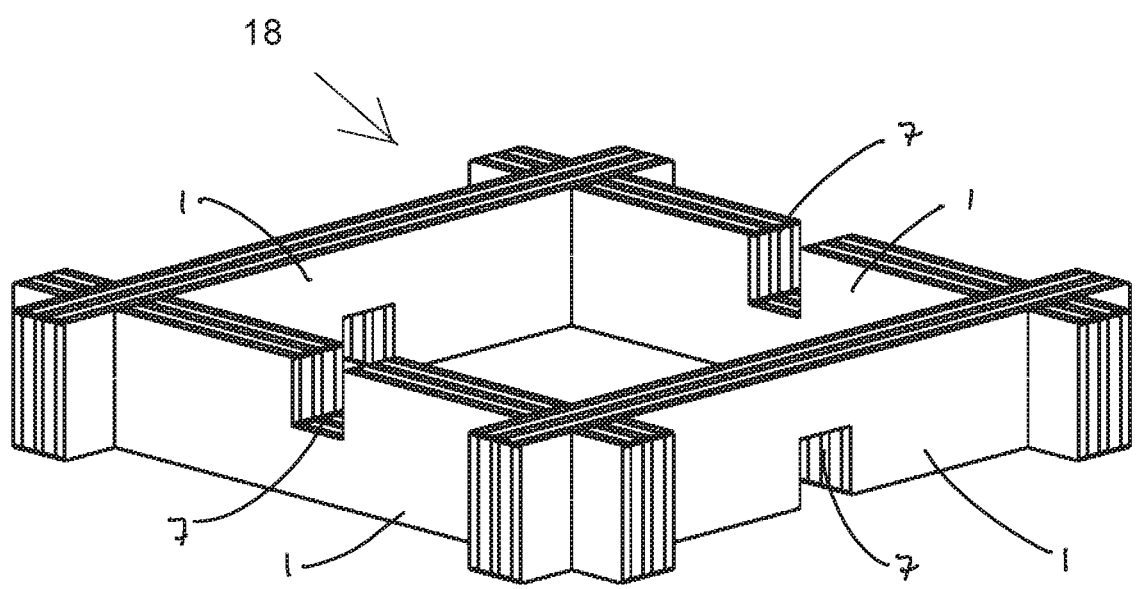
FIG. 24 is a perspective view of the shipping riser assembly of FIG. 23.

With reference to FIGS. 23 and 24, a riser assembly 18 according to an embodiment of the invention is shown and generally includes four riser 1 pieces arranged and connected into another support assembly. The four risers 1 of the shipping riser assembly 18 shown in FIGS. 23 and 24 interconnect to one another at the outer slots 8 with two of the shipping risers 1 having an inverted orientation from the other two risers 1. The assembly 18 in this embodiment forms a square shape with a vacant center. The core 5 of the paper roll 11 is not supported, but the perimeter of a load would be supported.

Figure 25:
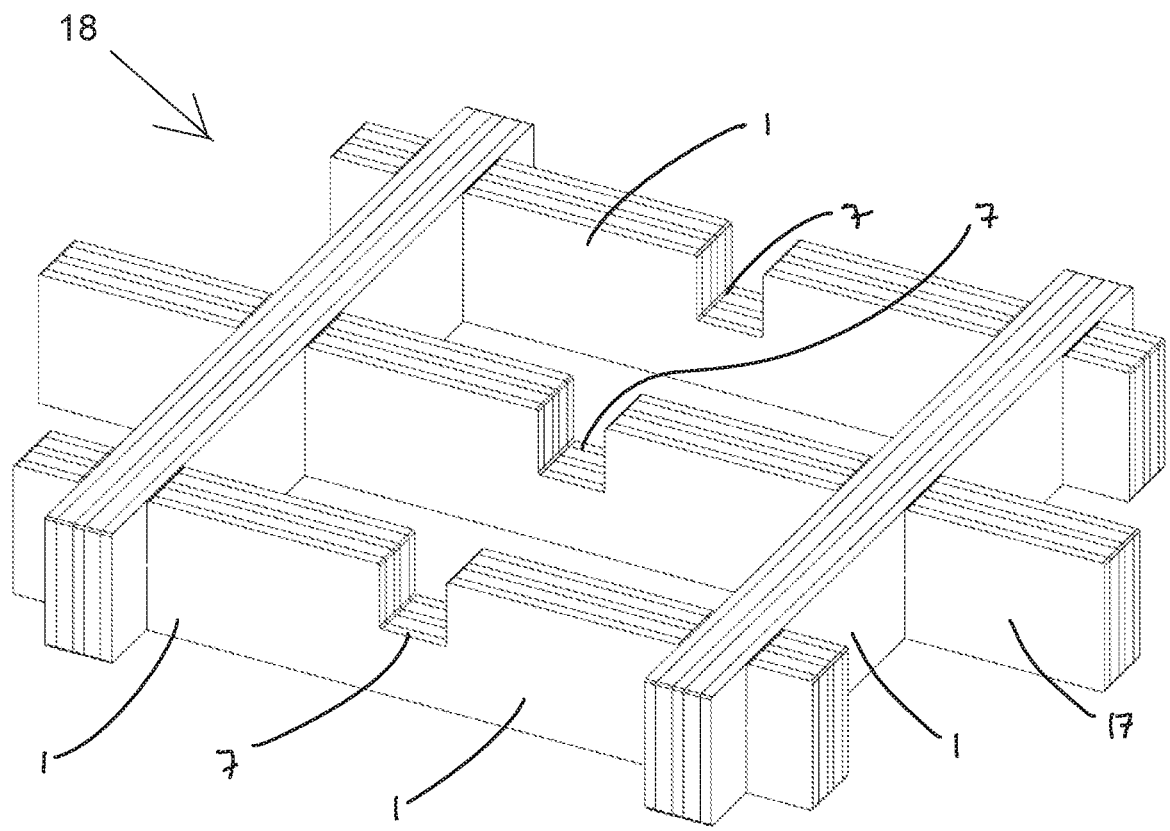
FIG. 25 is a perspective view of a riser assembly according to the invention.
Figure 26:
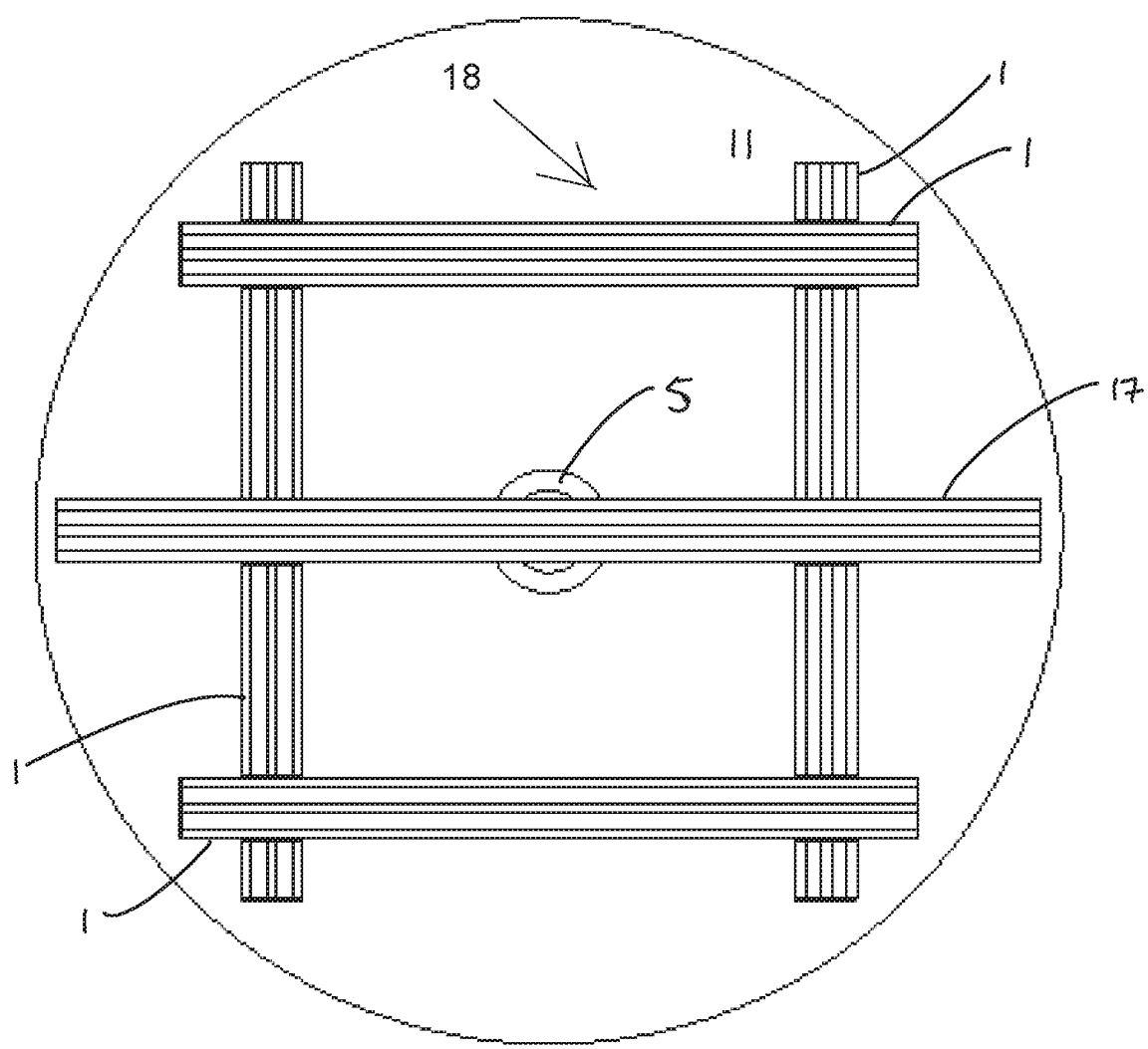
FIG. 26 is a bottom view of the shipping riser assembly of FIG. 25 with a paper roll.

With reference to FIGS. 25 and 26, a riser assembly 18 according to an embodiment of the invention is shown and generally includes five riser 1 pieces arranged and connected to provide another support assembly. The shipping riser assembly 18 shown in FIGS. 25 and 26 includes a longer riser 17 constructed of the same materials as the shipping riser 1 and having slots 7, 8 positioned in a same position along a longitudinal direction of the shipping riser 17 as the shipping riser 1. Differing lengths of risers 1, 17 are constructed for assemblies involving larger paper rolls 11. Each riser 1, 17 is constructed with slots 7, 8 enabling it to be assembled to additional risers 1, 17. As shown in FIG. 26, the paper roll 11 is supported by the five-part riser assembly 18 and the five-part riser assembly 18 does not extend beyond an outer perimeter of the paper roll 11.

Figure 27:
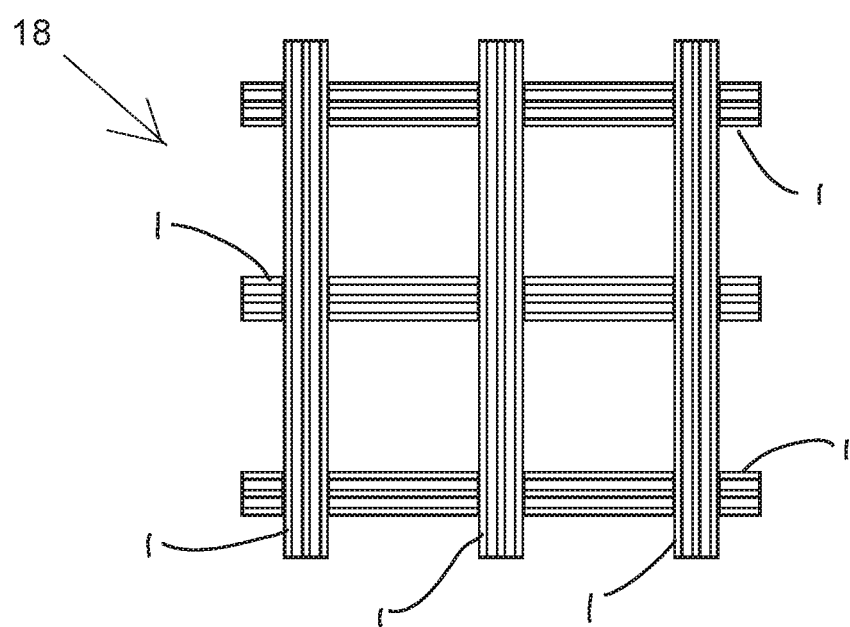
FIG. 27 is a top view of a riser assembly according to the invention.
Figure 28:
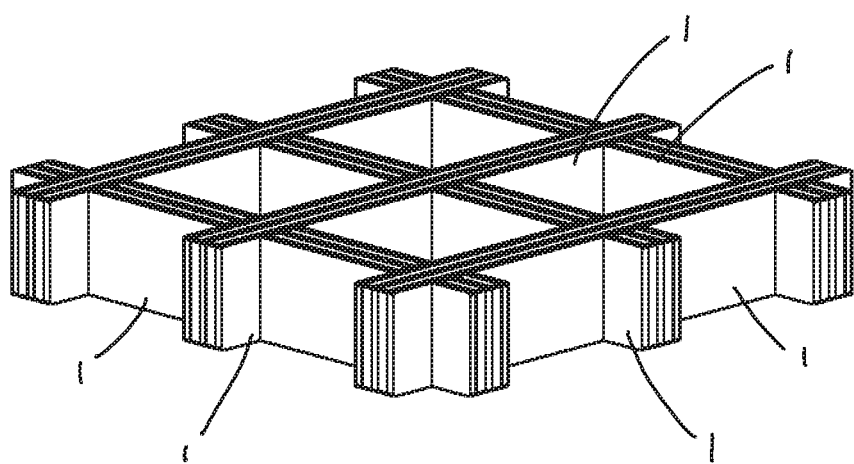
FIG. 28 is a perspective view of the shipping riser assembly of FIG. 28.
Figure 29:
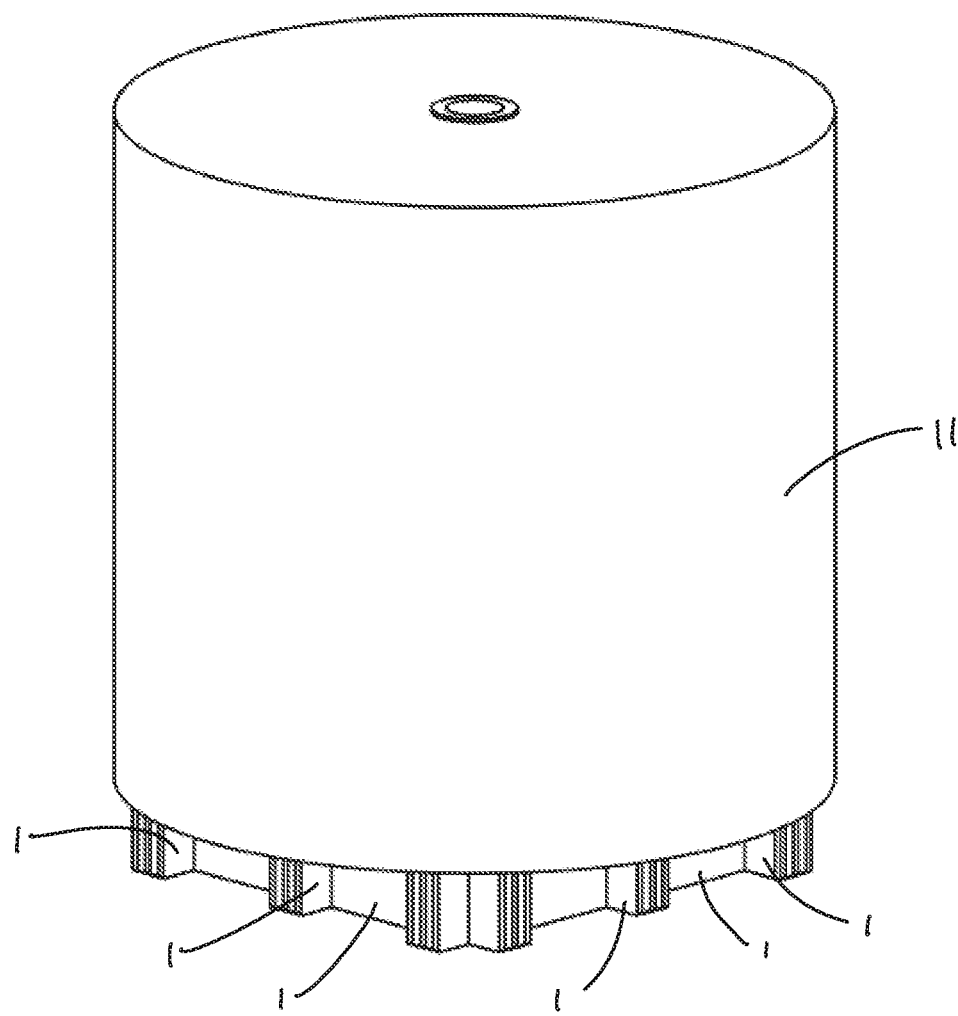
FIG. 29 is a perspective of the shipping riser assembly of FIG. 28 with a paper roll.

With reference to FIGS. 27-29, a riser assembly 18 according to an embodiment of the invention is shown and generally includes six riser 1 pieces arranged and connected to provide another support assembly. The shipping riser assembly 18 is assembled with the central 7 and outer 8 slots to create a rigid structure with a square perimeter and a central structure to support larger and heavier paper rolls 11.

As shown in FIG. 29, the shipping riser assembly 18 does not extend beyond an outer perimeter of the paper roll 11.

Figure 30:
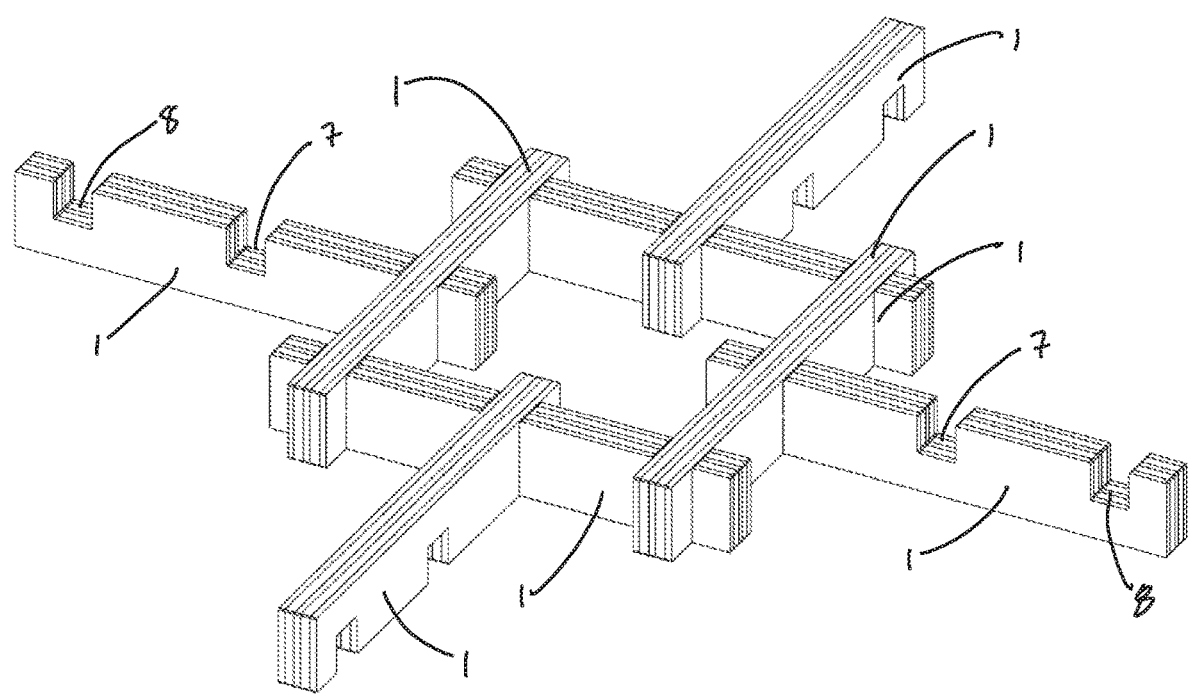
FIG. 30 is a perspective view of a riser assembly according to the invention.

With reference to FIG. 30, a multi-part riser assembly 18 according to an embodiment of the invention is shown and can be assembled into multiple different combinations. The embodiments of the multi-riser assemblies disclosed herein are merely exemplary and are not intended to be limiting. In the embodiment shown in FIGS. 30 and 31, the multi-part riser assembly 18 has a four riser 1 central square and four other risers 1 with the outer slots 8 engaging the central slots 7 of the shipping risers 1 of the central square. The assembly 18 is symmetric as shown in FIG. 30. The greater the number of riser 1 in any assembly 18 results in stronger and more stable structures for loading and weight management of goods.

Figure 31:
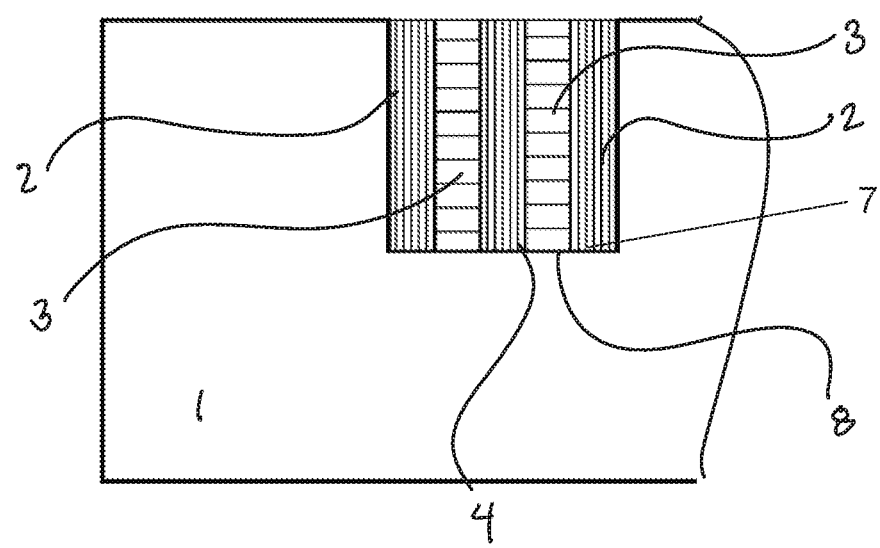
FIG. 31 is a sectional side view through a joint of a riser with another riser.

A fit of a central slot 7 of a riser 1 with an outer slot 8 of another riser 1 is shown in FIG. 31. As shown in FIG. 31, the slot 7, 8 height is half of a height of the shipping riser 1.

The use of high and low density sections in the creation of the shipping riser 1 yields an economic benefit. Whereby a riser constructed of a singular material has a constant density, either heavy or lightweight, it is not optimized for structure and weight or function. A wood riser weighs more than a corrugated cardboard riser. A corrugated cardboard riser weighs more than a honeycomb cardboard riser. The weight of the wood is greater than the corrugated cardboard and the honeycomb. Economically, though it is much cheaper to ship a lightweight material. The combination of dense corrugated cardboard and honeycomb cardboard in the shipping riser 1 of the embodiments disclosed above is economic in the fact it takes the structure from one element and combines it with the lightweight characteristic of another to construct a hybrid member.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A shipping riser comprising:
   a structure having:
      a central laminated structure;
      a pair of middle laminated structures positioned on and secured to opposite sides of the central laminated structure;
      a pair of outer laminated structures positioned on and secured to opposite sides of the pair of middle laminated structures to form a solid laminated structure; and
      a plurality of first slots extending through the solid laminated structure in a direction perpendicular to a longitudinal axis thereof;
      wherein the plurality of laminated structures interlock with each other by way of the slots to form a collapsible support.

2. The shipping riser of claim 1, wherein the pair of middle laminated structures are disposed symmetrically about the central laminated structure.

3. The shipping riser of claim 2, wherein the pair of outer laminated structures are disposed symmetrically about the central laminated structure.

4. The shipping riser of claim 1, wherein the central laminated structure includes individual layers of corrugated cardboard, honeycomb cardboard or fibrous materials.

5. The shipping riser of claim 4, wherein each of the pair of middle laminated structures includes individual layers of corrugated cardboard, honeycomb cardboard or fibrous materials.

6. The shipping riser of claim 4 wherein each of the pair of middle laminated structures includes individual layers of corrugated cardboard, honeycomb cardboard or fibrous materials.

7. The shipping riser of claim 3, wherein the central laminated structure includes individual layers of corrugated cardboard.

8. The shipping riser of claim 7, wherein each of the pair of middle laminated structures includes individual layers of honeycomb cardboard.

9. The shipping riser of claim 8, wherein each of the pair of outer laminated structures includes individual layers of corrugated cardboard.

10. The shipping riser of claim 9, wherein the individual layers of corrugated cardboard include double walled cardboard with high density corrugation.

11. The shipping riser of claim 10, further comprising a plurality of slots extending through the engineered structure in a direction perpendicular to a longitudinal axis thereof.

12. The shipping riser of claim 6, wherein pair of outer laminated structures and the central laminated structure have a higher load bearing rating than the pair of middle laminated structures.

13. The shipping riser of claim 1, further comprising a pair of end blocks positioned at opposite ends of the central laminated structure and the pair of middle laminated structures.

14. The shipping riser of claim 13, wherein the pair of end blocks are positioned along inner surfaces of the pair of outer laminated structures.

15. The shipping riser of claim 14, wherein each of the pair of end blocks is a densely constructed corrugated cardboard or fibrous based materials and secured to the engineering structure using an adhesive.

16. The shipping riser of claim 1, wherein the central laminated structure, the pair of middle laminated structures, and the pair of outer laminated structures all have the same size and shape.

17. A shipping riser assembly comprising:
   a central laminated section;
   a pair of middle laminated sections positioned on opposite sides of and secured to the central laminated layer;
   a pair of outer laminated sections positioned on opposite sides of and secured to the pair of middle laminated sections to provide a first laminated structure;
   a plurality of first slots extending through the first laminated structure in a direction perpendicular to a longitudinal axis thereof; and
   a second laminated structure of similarly shaped slots interlocking with the slots of the first laminated structure.

18. The shipping riser assembly of claim 17, wherein the plurality of slots include a central slot and a pair of outer slots.

19. The shipping riser assembly of claim 18, wherein the pair of outer slots are symmetric of a central plane extending through the first laminated structure.

20. The shipping riser assembly of claim 19, further comprising the second laminated structure having a plurality of second slots extending through a central laminated section, a pair of middle laminated sections, and a pair of outer laminated section, the plurality of second slots corresponding to the plurality of first slots.

21. The shipping riser assembly of claim 20, wherein the central laminated section includes individual layers of corrugated cardboard, honeycomb cardboard or fibrous materials.

22. The shipping riser assembly of claim 21, wherein each of the pair of middle laminated sections includes individual layers of corrugated cardboard, honeycomb cardboard or fibrous materials.

23. The shipping riser assembly of claim 1, wherein each of the pair of middle laminated sections includes individual layers of corrugated cardboard, honeycomb cardboard or fibrous materials.

24. The shipping riser assembly of claim 23, wherein the central laminated section includes individual layers of corrugated cardboard.

25. The shipping riser assembly of claim 24, wherein each of the pair of middle laminated sections includes individual layers of honeycomb cardboard.

26. The shipping riser assembly of claim 25, wherein each of the pair of outer laminated sections includes individual layers of corrugated cardboard.

27. The shipping riser assembly of claim 26, wherein the individual layers of corrugated cardboard include double walled cardboard with high density corrugation.

28. The shipping riser assembly of claim 17, further comprising a pair of end blocks positioned at opposite ends of the central laminated section and the pair of middle laminated sections of the first laminated structure.

29. The shipping riser of claim 28, wherein the pair of end blocks are positioned along inner surfaces of the pair of outer laminated sections.

30. The shipping riser of claim 29, wherein each of the pair of end blocks is a densely constructed corrugated cardboard or fibrous based materials and secured to the plurality of outer laminated sections using an adhesive.

* * * * *